United States Patent
Wasilewsky et al.

(10) Patent No.: US 9,652,737 B1
(45) Date of Patent: May 16, 2017

(54) SYSTEM AND METHOD FOR INVENTORY IDENTIFICATION AND QUANTIFICATION

(71) Applicant: BULLET SCANNING, LLC, Atlanta, GA (US)

(72) Inventors: Jed Wasilewsky, Atlanta, GA (US); Chase Campbell, Atlanta, GA (US); Kelly Storm, Athens, GA (US)

( * ) Notice: Subject to any disclaimer, the term of this patent is extended or adjusted under 35 U.S.C. 154(b) by 0 days.

(21) Appl. No.: 15/287,788

(22) Filed: Oct. 7, 2016

Related U.S. Application Data

(60) Provisional application No. 62/250,047, filed on Nov. 3, 2015.

(51) Int. Cl.
| | |
|---|---|
| *G06Q 10/08* | (2012.01) |
| *G06K 19/06* | (2006.01) |
| *G06K 7/14* | (2006.01) |
| *G06K 7/10* | (2006.01) |
| *G06K 17/00* | (2006.01) |

(52) U.S. Cl.
CPC ....... *G06Q 10/087* (2013.01); *G06K 7/10881* (2013.01); *G06K 7/1417* (2013.01); *G06K 17/0022* (2013.01); *G06K 19/06037* (2013.01)

(58) Field of Classification Search
CPC ............... G06Q 10/087; G06K 7/1417; G06K 19/06037; G06K 7/10881; G06K 17/0022
See application file for complete search history.

(56) References Cited

U.S. PATENT DOCUMENTS

| | | | |
|---|---|---|---|
| 5,682,030 A | 10/1997 | Kubon | |
| 8,245,926 B2 | 8/2012 | Guess et al. | |
| 8,496,177 B2 | 7/2013 | Sevier et al. | |
| 8,917,902 B2 | 12/2014 | Hicks | |
| 2009/0192921 A1* | 7/2009 | Hicks | G06F 3/0312 705/28 |
| 2010/0030777 A1* | 2/2010 | Panwar | G06Q 10/087 707/600 |

(Continued)

FOREIGN PATENT DOCUMENTS

| | | | |
|---|---|---|---|
| CN | 102496099 A | * | 6/2012 |
| CN | 102496099 | | 10/2015 |
| CN | 102496099 B | * | 10/2015 |

*Primary Examiner* — Sonji Johnson
(74) *Attorney, Agent, or Firm* — Smith Tempel Blaha LLC; Matthew T. Hoots

(57) ABSTRACT

A solution for inventory identification and quantification using a portable computing device ("PCD") comprising a camera subsystem is described. An exemplary embodiment of the solution comprises a method that begins with capturing a video stream of a physical inventory comprised of a plurality of individual inventory items. Using a set of tracking points appearing in sequential frames, and optical flow calculations, coordinates for global centers of the frames may be calculated. From there, coordinates for identified inventory items may be determined relative to the global centers of the frames within which they are captured. Comparing the calculated coordinates for inventory items identified in each frame, as well as fingerprint data, embodiments of the method may identify and filter duplicate image captures of the same inventory item within some statistical certainty. Symbology data, such as QR codes, are decoded and quantified as part of the inventory count.

20 Claims, 12 Drawing Sheets

(56) References Cited

U.S. PATENT DOCUMENTS

2010/0158310 A1\*  6/2010  McQueen .............. G06K 9/00
                                              382/100
2010/0164694 A1\*  7/2010  Matsubara ........... G06Q 10/087
                                              340/10.42
2016/0088262 A1   3/2016  Lee et al.

\* cited by examiner

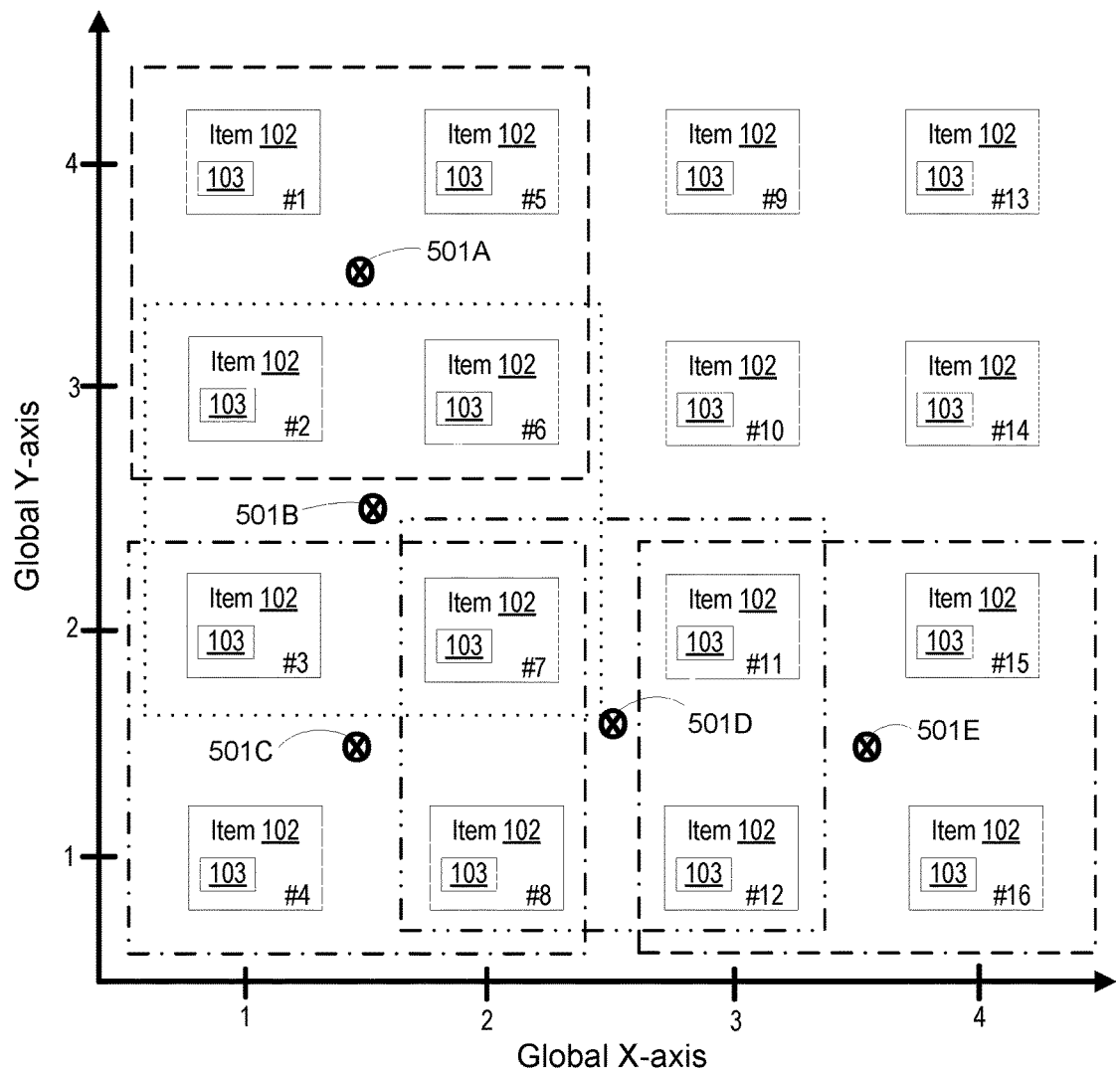
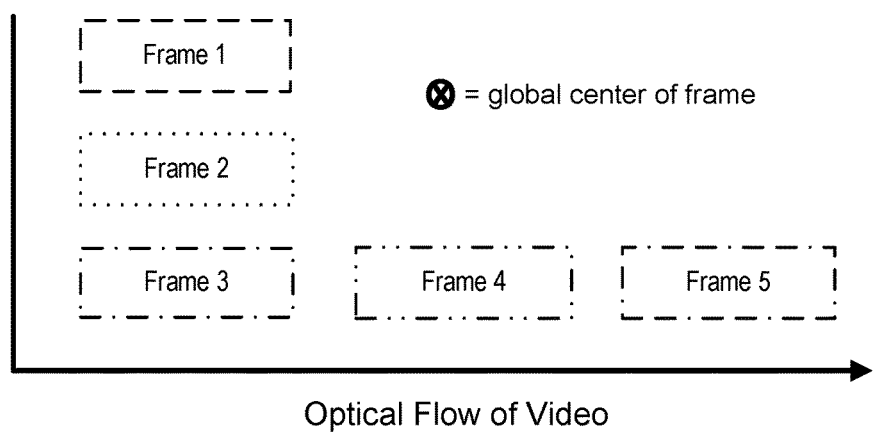
FIG. 5B

FIG. 6

| Frame | Item | Count | Global Coordinates | Item Neighborhood | Item Fingerprint ||||| Contents |
|---|---|---|---|---|---|---|---|---|---|
| | | | | | Hash value | B/W | White Balance | Size cm² | |
| 1 | 1 | Y | 0.9, 4.0 | 5, 2 | 1 | 155 | Green | 24x8 | Product A |
| 1 | 2 | Y | 11, 3.1 | 1, 3, 5, 6 | 2 | 180 | Blue | 24x8 | Product A |
| 2 | 2' | N | 1.0, 3.0 | 1, 3, 5, 6 | 2 | 178 | Green | 24x8 | Product A |
| 2 | 3 | Y | 1.0, 2.0 | 2, 4, 6, 7 | 3 | 145 | Red | 20x8 | Product B |
| 3 | 3' | N | 1.0, 2.1 | 2, 4, 6, 7 | 3 | 149 | Red | 20x8 | Product B |
| 3 | 4 | Y | 1.2, 1.3 | 3, 7, 8 | 4 | 200 | Yellow | 20x8 | Product B |
| 1 | 5 | Y | 2.0, 4.1 | 1, 2, 6, 15 | 5 | 113 | Red | 20x8 | Product B |
| 1 | 6 | Y | 2.0, 3.0 | 2, 3, 5, 7, 11, 15 | 6 | 191 | Yellow | 20x8 | Product B |
| 2 | 6' | N | 2.1, 2.9 | 2, 3, 5, 7, 11, 15 | 6 | 199 | Yellow | 20x8 | Product B |
| 2 | 7 | Y | 1.8, 2.0 | 3, 4, 6, 8, 11 | 7 | 208 | Blue | 20x8 | Product B |
| 3 | 7' | N | 2.0, 2.0 | 3, 4, 6, 8, 11 | 7 | 200 | Blue | 20x8 | Product B |
| 4 | 7'' | N | 2.0, 1.9 | 3, 4, 6, 8, 11 | 7 | 199 | Blue | 20x8 | Product B |
| 3 | 8 | Y | 2.3, 1.1 | 4, 7, 11, 12 | 8 | 236 | Green | 22x10 | Product C |
| 4 | 8' | N | 2.2, 1.0 | 4, 7, 11, 12 | 8 | 212 | Green | 22x10 | Product C |
| 4 | 11 | Y | 3.1, 2.1 | 6, 7, 8, 12, 15 | 9 | 177 | Green | 22x10 | Product C |
| 5 | 11' | N | 3.0, 2.2 | 6, 7, 8, 12, 15 | 9 | 177 | Blue | 22x10 | Product C |
| 4 | 12 | Y | 3.0, 1.0 | 8, 11, 15, 16 | 10 | 113 | Red | 22x10 | Product C |
| 5 | 12' | N | 3.1, 0.9 | 8, 11, 15, 16 | 10 | 115 | Yellow | 22x10 | Product C |
| 5 | 15 | Y | 4.2, 2.3 | 5, 6, 11, 12, 16 | 11 | 199 | Red | 22x10 | Product C |
| 5 | 16 | Y | 3.9, 0.9 | 12, 15 | 12 | 190 | Red | 22x10 | Product C |
| ... | ... | ... | ... | ... | ... | ... | ... | ... | ... |

SYSTEM AND METHOD FOR INVENTORY IDENTIFICATION AND QUANTIFICATION

CROSS-REFERENCE TO RELATED APPLICATIONS

This claims priority under 35 U.S.C. §119(e) to U.S. provisional application filed on Nov. 3, 2015 entitled METHOD AND SYSTEM FOR LARGE FIELD-OF-VIEW READING THROUGH CAMERA-BASED READERS and assigned application Ser. No. 62/250,047, the entire contents of which are hereby incorporated by reference.

BACKGROUND

Cost effective, time efficient, and accurate management of heterogeneous inventory is a ubiquitous goal of businesses across market segments. Current systems and methods for managing inventory, however, leave much room for improvement.

Consider, for example, a shoe store that offers numerous styles of shoes, each in various sizes. Managing the inventory such that the store knows when to timely replenish a shoe of a certain style and size is paramount in order to make sure that the store will be positioned to fill consumer demand without having to carry an inordinate amount of inventory. Necessarily, to effectively manage inventory, a business such as a shoe store spends a lot of expensive employee time literally counting the inventory and verifying its accuracy against prior inventory counts, quantity adjustments (such as may be due to shipping actions, returns exchanges, removals, relocation, etc.), and sales receipts. Duplicate counts, missed counts, inaccurate product identification and the like all lend to inaccurate inventory counts. As such, systems and methods that improve the efficiency and accuracy of inventory management represent a longstanding and ever present need in the art.

Systems known in the prior art leverage handheld scanners. Employees use the scanners to recognize a symbology code (e.g., barcode, QR code, etc.) on a box of goods (e.g., a box of shoes). For each scan, the system tallies a count of "1" in association with the product identified by the symbology code. While such a prior art system is an improvement over an employee armed with nothing more than his fingers to count with, his knowledge of the product types, a pen, and a pad, they are still prone to miscounts due to double scans, missed scans and the like. Also, prior art systems known in the art struggle with inventories having mixed symbologies to identify different goods as the scanners are usually configured to recognize and read only certain types of business symbologies.

SUMMARY OF THE DISCLOSURE

A method and system are described for inventory identification and quantification using a portable computing device ("PCD") comprising a camera subsystem. An exemplary embodiment of the solution comprises a method that begins with capturing a video stream of a physical inventory comprised of a plurality of individual inventory items. As would be understood by one of ordinary skill in the art, the video stream may comprise a series of frames. In a first frame and a second frame, a set of tracking points appearing in both frames is identified. The tracking points may be averaged to generate a single, virtual tracking point. That is, between any two neighboring frames, a set of tracking points appearing in both frames may be identified and the averaged relative distance may be computed to generate the change/delta in distance between the frames' center tracking points. Moreover, the set of tracking points may be determined or calculated using, for example, one of the Shi-Tomasi corner detection algorithms or the Harris Corner Detection method.

A set of coordinates defining a global center of the first frame is calculated. It is envisioned that in some embodiments the set of coordinates defining the global center of the first frame in a series of frames from the video stream may be designated as [0,0], but such is not required of all embodiments of the solution. Then, based on a first location of the tracking points in the first frame and a second location of the tracking points in the second frame, the optical flow from the first frame to the second frame is determined. In this way, the method "knows" which direction the video is "moving" relative to the inventory being captured. It is envisioned that the optical flow may be determined using, for example, the Lucas-Kanade method when provided the set of points returned by the Shi-Tomasi corner detection algorithms or Harris Corner Detection Method. Now, based on the optical flow and a delta of the second location of the tracking points in the second frame relative to the first location of the tracking points in the first frame, the method may calculate a set of coordinates defining a global center of the second frame. Note that the tracking points are associated with some stationary objects in the subject matter being videoed (i.e., pixels representing particular features defined by the visual characteristics of any discernable corners of stationary objects) and, as such, appear at different relative locations in sequential frames due to the optic flow of the video.

Inventory items captured in the first frame are identified using learning techniques that recognize predefined features in an image data, as would be understood by one of ordinary skill in the art. For example, inventory items may be identified by detecting scannable objects by identifying areas within a frame that have the same, or very similar, aspect ratio to that of an object of interest. The scannable objects identified may be filtered by removing any object that does not have a sufficient number of Hough lines and a balanced black-to-white ratio within acceptable stddev/error-rates. The existence of an inventory item may be confirmed by return of a translated message derived from symbology associated with the item.

For each identified inventory item captured in the first frame, global coordinates are calculated relative to the global center of the first frame, any symbology associated with the identified inventory item is decoded, and the global coordinates and decoded symbology may be recorded in association with the identified inventory item. In this way, the method begins to compile an inventory quantification.

Next, for each identified inventory item captured in the second frame, global coordinates are calculated relative to the global center of the second frame, any symbology associated with the identified inventory item may be decoded, and the global coordinates and decoded symbology may be recorded in association with the identified inventory item. Notably, because the first and second frames are sequential, an inventory item captured in the first frame may be captured in duplicate in the second frame, as would be recognized by one of ordinary skill in the art. Therefore, for each identified inventory item from the second frame, the exemplary method may compare its global coordinates with global coordinates associated with inventory items identified from the first frame. From there, for each identified inventory item from the second frame having global coordinates that are statistically insignificantly different from global coordinates associated with an inventory item identified from the first frame, the method may flag such identified inventory item from the second frame as a duplicate capture and filter its associated decoded symbology from an inventory quantification (or, in some embodiments, decline to decode its symbology altogether).

To improve the statistical analysis, the exemplary embodiment may also, for each identified inventory item captured in the first frame, calculate fingerprint data and record the fingerprint data in association with the identified inventory item. Fingerprint data may include any one or more of, but is not limited to including any one or more of, a hash value, quantity of Hough lines, non-zero pixel ratio, black/white pixel ratio, white balance value, and object size, and neighborhood data (a planar, induced subgraph of all relevant objects or other inventory items adjacent to a given inventory item). Similarly, for each identified inventory item captured in the second frame, the method may calculate fingerprint data and record the fingerprint data in association with the identified inventory item. Then, for each identified inventory item from the second frame, its fingerprint data may be compared with fingerprint data associated with inventory items identified from the first frame. Now, using the comparison of global coordinates in conjunction with the comparison of fingerprint data, the exemplary method may, for each identified inventory item from the second frame having global coordinates and fingerprint data that are statistically insignificantly different from global coordinates and fingerprint data associated with an inventory item identified from the first frame, flag such identified inventory item from the second frame as a duplicate capture and filter its associated decoded symbology from an inventory quantification (or, in some embodiments, decline to decode its symbology altogether).

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the figures. Letter character designations for reference numerals may be omitted when it is intended that a reference numeral encompass all parts having the same reference numeral in all figures.

FIGS. 5A-5C collectively illustrate an exemplary embodiment of the solution as it identifies and quantifies inventory items from a video stream;

FIG. 6 is an exemplary inventory record generated by the embodiment of FIG. 5.

DETAILED DESCRIPTION

Figure 1A:
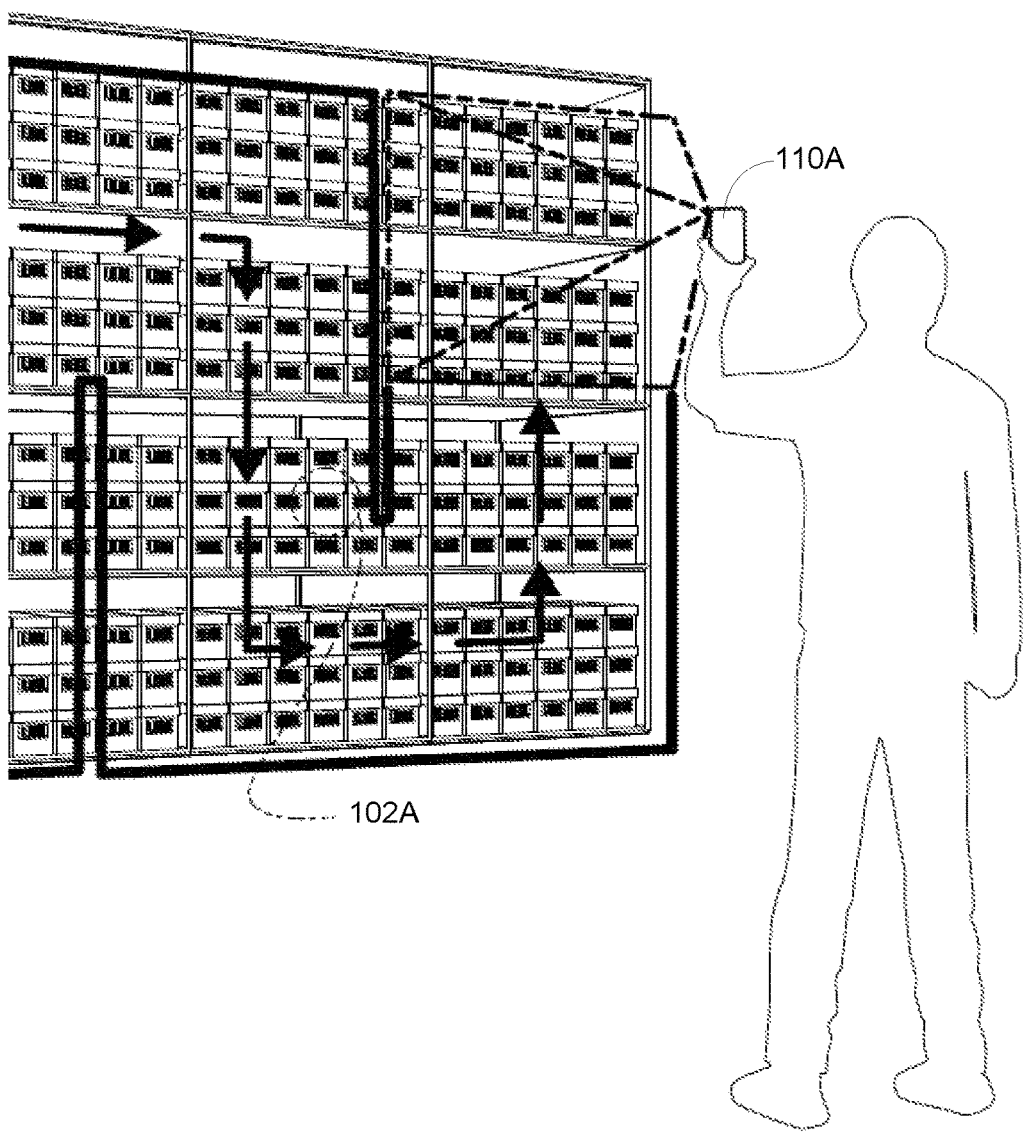
FIG. 1A illustrates an exemplary application of an embodiment of the solution for inventory identification and quantification using a portable computing device ("PCD") that includes a video camera subsystem.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed. Further, an "application" may be a complete program, a module, a routine, a library function, a driver, etc.

The term "content" may also include files having executable content, such as: object code, scripts, byte code, markup language files, and patches. In addition, "content" referred to herein, may also include files that are not executable in nature, such as documents that may need to be opened or other data files that need to be accessed, transmitted or rendered.

In this description, the term "symbology" is used to generally refer to any type of matrix barcode (or multi-dimensional bar code) or identifier associated with an inventory item and is not meant to limit the scope of any embodiment to the use of a specific type of barcode, such as, for example, what may be understood in the art to be a quick response code. That is, it is envisioned that any given embodiment of the systems and methods within the scope of this disclosure may use any type of machine-readable symbology or combinations of machine-readable symbologies so long as such symbologies are associated with either predefined feature descriptions or sets of positive/negative examples of instances of the given symobology itself. Moreover, as one of ordinary skill in the art understands, a symbology in the form of a matrix barcode is an optical machine-readable label that may be associated with data such as data representative of an inventoried item. An exemplary matrix barcode, for example, may include black modules (square dots) arranged in a square grid on a white background. The information encoded by the barcode may be comprised of four standardized types of data (numeric, alphanumeric, byte/binary, Kanji) or, through supported extensions, virtually any type of data. As one of ordinary skill in the art further understands, a symbology such as a matrix barcode may be read by an imaging device, such as a camera, and formatted algorithmically by underlying software using error correction algorithms until the image can be appropriately interpreted. Data represented by the barcode may then be extracted from patterns present in both horizontal and vertical components of the image.

In this description, the terms "item" and "good" are used interchangeably to refer to a piece of inventory included in a larger pool of inventory. An item or good may have a uniquely coded symbology associated with it, the recognition and decoding of which may be leveraged to identify and quantify the good as part of the larger inventory.

In this description, the term "global coordinates" refers to a unique set of coordinates uniquely associated with a given identified and readable symbology of an inventory item that serve to define a virtual location of the given inventory item relative to other inventory items in a virtual planar space. Similarly, the term "global center" refers to a unique set of coordinates that serve to define a virtual location in a virtual planar space for a geographic center of an image captured by a video frame. As will be more thoroughly described herein, "global coordinates" of identified and readable symbologies of inventory items captured in the image of a given video frame, or composite of video frames, may be determined based on the "global center" of the given video frame.

In this description, the term "neighborhood" or "object neighborhood" or "item neighborhood" refers to an induced subgraph, as would be understood by one of ordinary skill in the art of graph theory, defining all known inventory items adjacent to a given inventory item.

In this description, the term "fingerprint" or "object fingerprint" or "item fingerprint" refers to any one or more features or measurable properties associated with an identified object such as an inventory item. The features that define an item's fingerprint may be either numeric or structural in nature. As a way of example, and not limitation, features that may be used to define an object fingerprint include, but are not limited to, hough lines, object height, object width, black/white pixel ratio, non-zero pixel ratio, white balance, hash value, etc.

In this description, an "identifiable" object is any object within a video frame or frame composite for which all relevant features are detected and are independent from all other features detected from other partially or wholly identifiable objects. An object is "readable" if a symbology associated with an identified object may be accurately decoded or interpreted.

In this description, two identifiable and readable objects captured in separate video frames may be considered equivalent, and thus the same object, if an object similarity probability calculation exceeds a given threshold. Depending on embodiment, such a probability calculation may consider the statistical significance of similarity among the objects' respective global coordinates, fingerprints, object neighborhood, etc.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component.

One or more components may reside within a process and/or thread of execution, and a component may be localized on one computer and/or distributed between two or more computers. In addition, these components may execute from various computer readable devices having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," "portable recording device" and "portable computing device" ("PCD") are used interchangeably. With the advent of third generation ("3G") and fourth generation ("4G") wireless technology, greater bandwidth availability has enabled more portable computing devices with a greater variety of wireless capabilities. Therefore, a portable computing device ("PCD") may include a cellular telephone, a pager, a PDA, a smartphone, a navigation device, a tablet personal computer ("PC"), a camera system, or a hand-held computer with a wireless connection or link.

Embodiments of the systems and methods provide for efficient quantification and management of a homogenous or diverse inventory. A video stream of the inventory is leveraged to identify and read symbologies affixed to individual inventory items without "double counting" any one item. As will be more thoroughly explained in view of the various figures, a video stream of an inventory is captured using either a stationary device (such as a mounted camera) or a portable device comprising a camera subsystem (such as a handheld smartphone or a drone-mounted system). The video stream is analyzed on a frame by frame basis, or in some embodiments selective "optimal" frames are analyzed, to identify and decode symbology codes (e.g., QR codes, bar codes, etc.). Because a video stream, which may for example have a frame rate of tens of frames per second, will capture an image of a given object multiple times, recognizing multiple captures and filtering duplicate captures from being quantified in an inventory count is a challenge addressed by embodiments of the solution.

To provide the basis for an exemplary, non-limiting application scenario in which aspects of some embodiments of the disclosed systems and methods may be suitably described, consider a shoe store that offers numerous styles and sizes of shoes from varying suppliers, including multiples of each variation. Each supplier may have a different packaging size, a different symbology format, a different symbology location, etc. Managing the heterogeneous inventory such that the store knows when to timely replenish a shoe of a certain style and size is paramount in order to make sure that the store will be positioned to fill consumer demand without having to carry an inordinate amount of inventory. Necessarily, to effectively manage inventory, a business such as a shoe store spends a lot of expensive employee time literally counting the inventory (I.e., "stock taking") and verifying its accuracy against prior inventory counts and sales receipts. Duplicate counts, missed counts, inaccurate product identification and the like all lend to inaccurate inventory counts. As such, systems and methods that improve the efficiency and accuracy of inventory management represent a longstanding and ever present need in the art. Embodiments of the solution fulfill those needs, and other needs, in a novel way.

Systems known in the prior art often leverage handheld, laser scanners. Employees use the scanners to recognize a symbology code (e.g., barcode, QR code, etc.) on a box of goods (e.g., a box of shoes). For each scan, the system tallies a count of "1" in association with the product identified by the symbology code. While such a prior art system is an improvement over an employee armed with nothing more than his fingers to count with, his knowledge of the product types, a pen, and a pad, they are still prone to miscounts due to double scans, missed scans and the like. They also take a lot of time to conduct.

Advantageously, embodiments of the solution provide for the use of a portable computing device ("PCD") to video an inventory and, from that video, identify and quantify an inventory count. Because the process may take little more time than it takes for an employee to literally walk down an inventory aisle while videoing the inventory, embodiments of the solution provide for near real-time reconciliation of inventory with POS receipts, backend accounting platforms, and procurement systems.

Turning now to the figures, exemplary aspects of the solution will be more thoroughly described.

FIG. 1A illustrates an exemplary application of an embodiment of the solution for inventory identification and quantification using a portable computing device ("PCD") 110A that includes a video camera subsystem. Referring back to the exemplary, non-limiting application scenario posited above, the FIG. 1A illustration may be considered in view of an inventory of shoe boxes. As previously noted, embodiments of the solution are not limited in application to taking inventory of shoes; rather, embodiments of the solution are described herein within the context of a shoe inventory for convenience of explanation only.

As illustrated, a user leverages the video capabilities of a PCD 110, such as a smartphone, to video the inventory in a pattern from left to right, then down, then left to right, then up. In this way, the user may capture a video of the entire inventory that is comprised of multiple individual inventory items 102 each having affixed thereto a symbology label 103 (see FIG. 1C).

Notably, the directional pattern illustrated in the FIG. 1 figures is just exemplary in nature and, as such, is not meant to suggest that embodiments of the solution are limited to the particular directional pattern illustrated. Advantageously, embodiments of the solution may be directionally agnostic and capable to accommodating any directional pattern, even a random pattern, generated by a user. Also, it should be understood that the process of videoing an inventory using a portable computing device presents various challenges including challenges stemming from "jittery" movement of the PCD, "in and out" movement of the PCD, "stops and starts" of the flow path of the PCD, etc. It is an advantage of embodiments of the solution that the inconsistent and unstable path of the PCD when a user is leveraging it to produce a video stream may not adversely affect the efficiency or accuracy of the application, as will be appreciated by one of ordinary skill in the art reviewing the present disclosure.

Figure 1B:
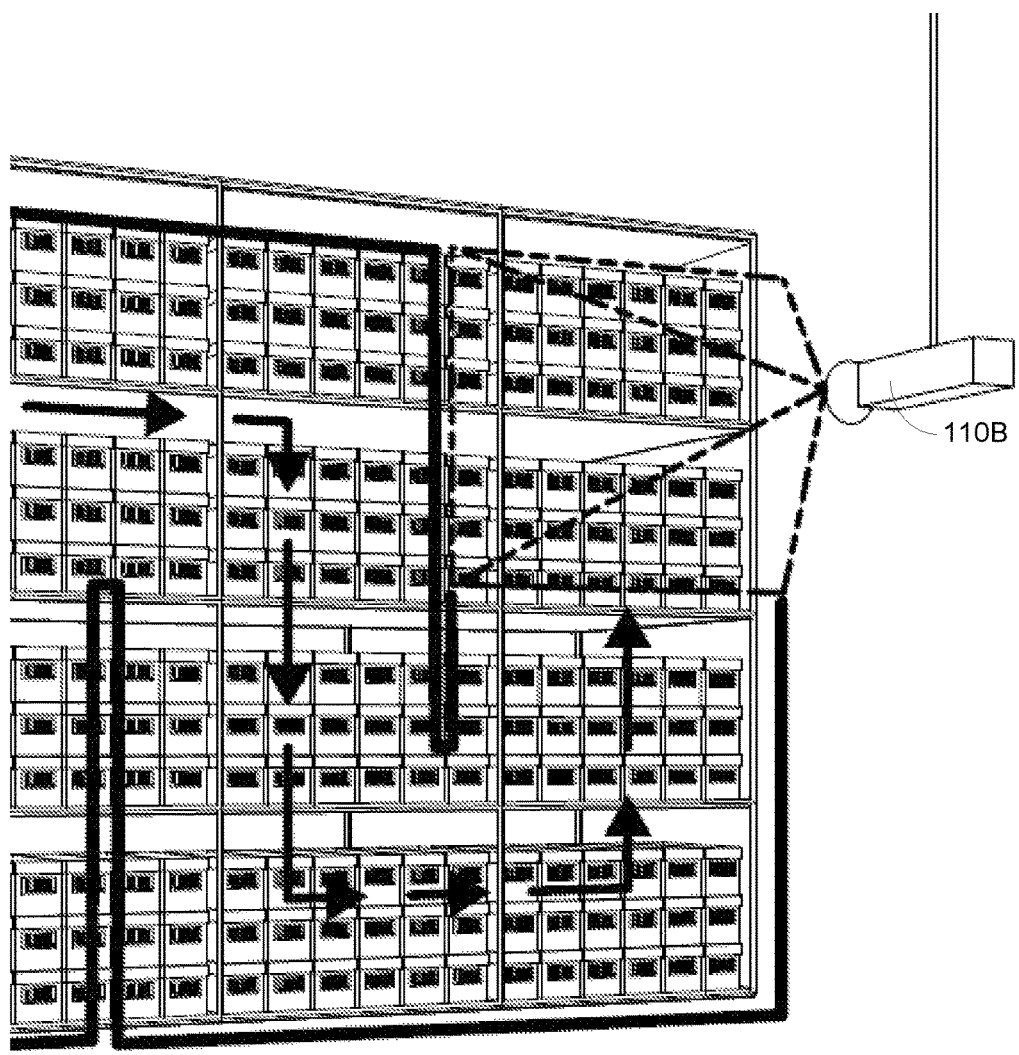
FIG. 1B illustrates an exemplary application of an embodiment of the solution for inventory identification and quantification using a stationary computing device ("SCD") that includes a video camera subsystem.

FIG. 1B illustrates an exemplary application of an embodiment of the solution for inventory identification and quantification using a stationary computing device ("SCD") 110B that includes a video camera subsystem. Advantageously, embodiments of the solution that make use of a stationary PCD, such as a pivotally mounted video camera, may provide for near continuous and real-time quantification and reconciliation of inventory.

Figure 1C:
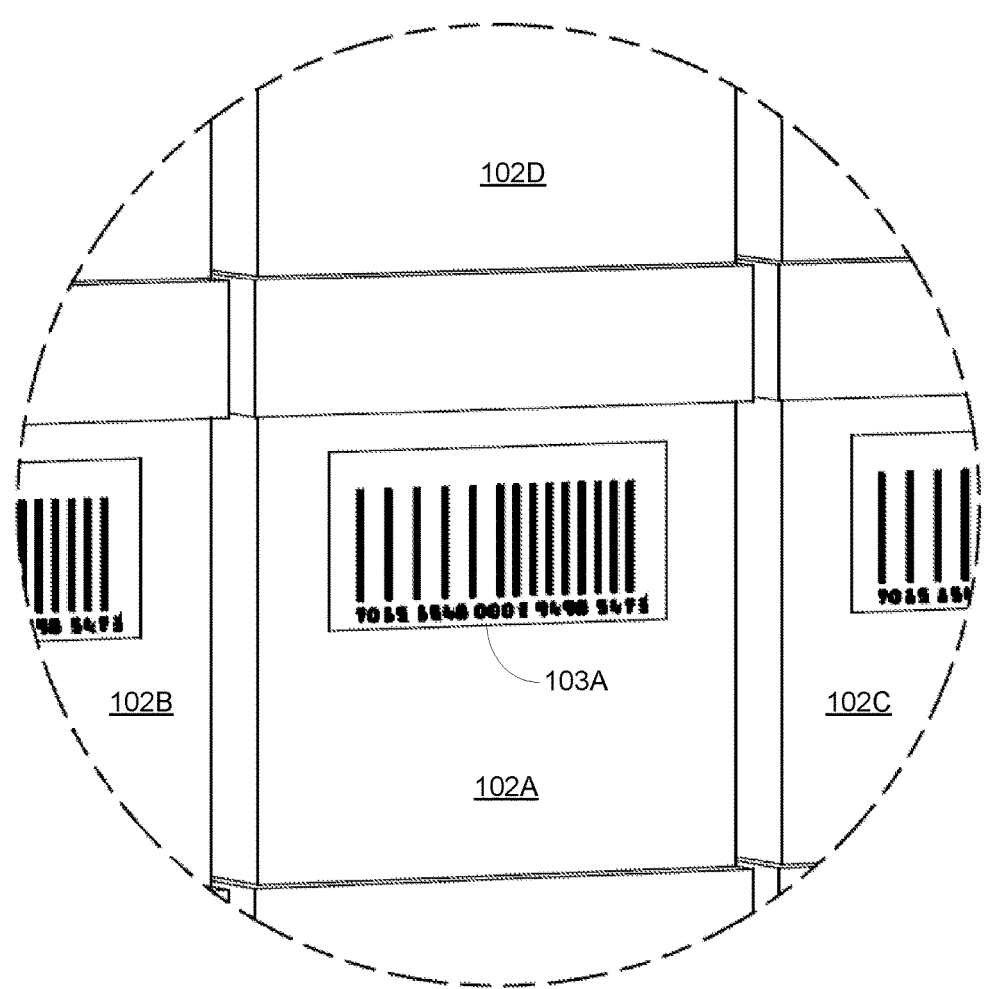
FIG. 1C illustrates a close-up view of an exemplary inventory item within a group of inventory items that has a symbology that is identifiable and readable by an exemplary embodiment of the solution.

FIG. 1C illustrates a close-up view of an exemplary inventory item 102A within a group of inventory items 102 that has a symbology 103A that is identifiable and readable by an exemplary embodiment of the solution. Advantageously, embodiments of the solution may be able to identify and read symbologies 103, even multiple different types of symbologies, from an inventory captured via a video stream. By leveraging one or more of various aspects more thoroughly described below, embodiments of the solution may use feature learning techniques to identify an inventory item 102 within a video stream, assign global coordinates to the identified inventory item in order to define the item's two-dimensional location relative to other identified items, record fingerprinting data uniquely associated with the captured image of the identified item, leverage symbology decoding logic to determine the contents of the identified item, and statistically compare the global coordinates and fingerprint data with that of previously identified inventory items in order to avoid duplicate counts of the same item.

Figure 2:
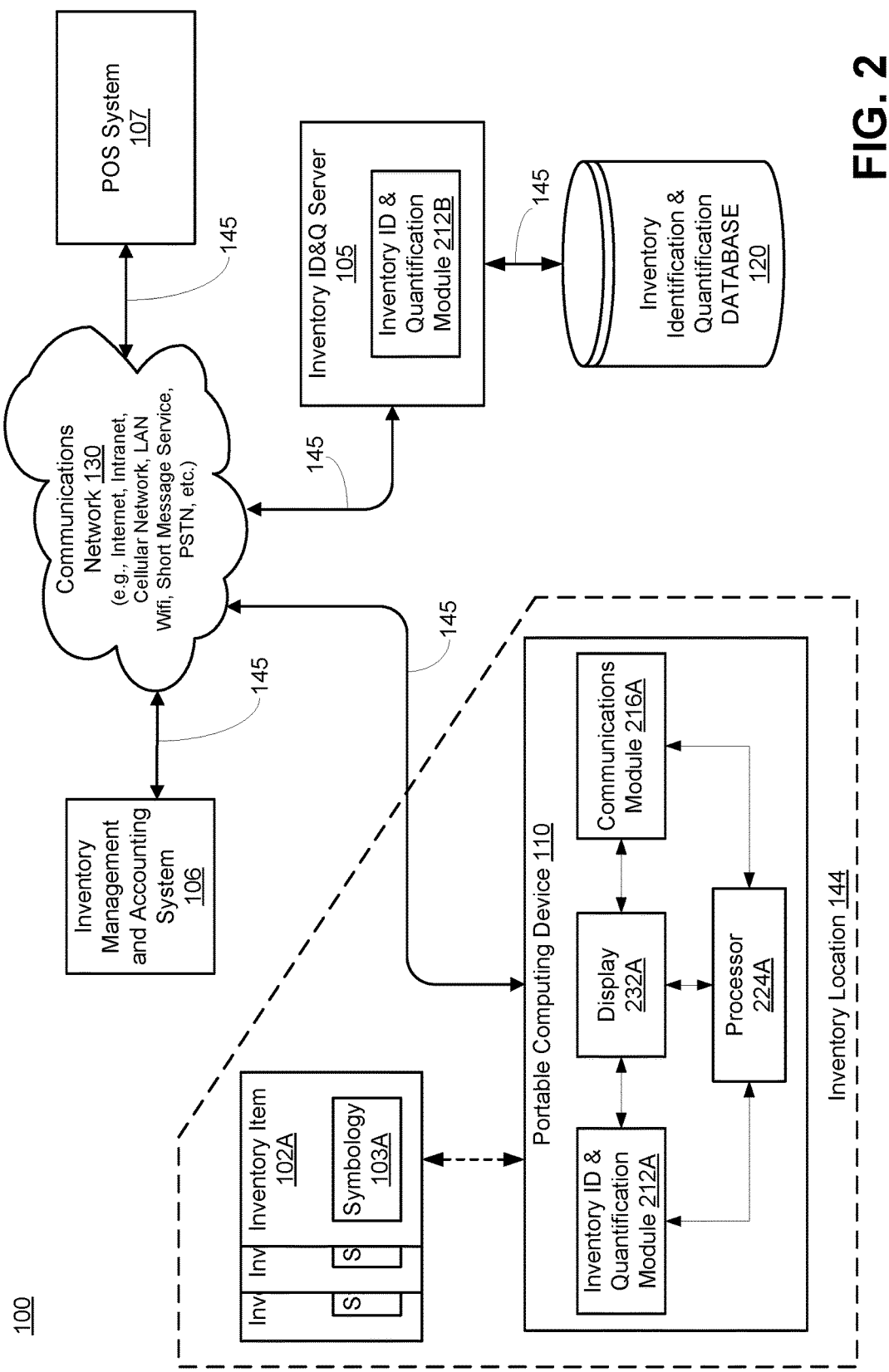
FIG. 2 is a functional block diagram illustrating exemplary components of a system for inventory identification and quantification according to an embodiment of the solution.
Figure 3:
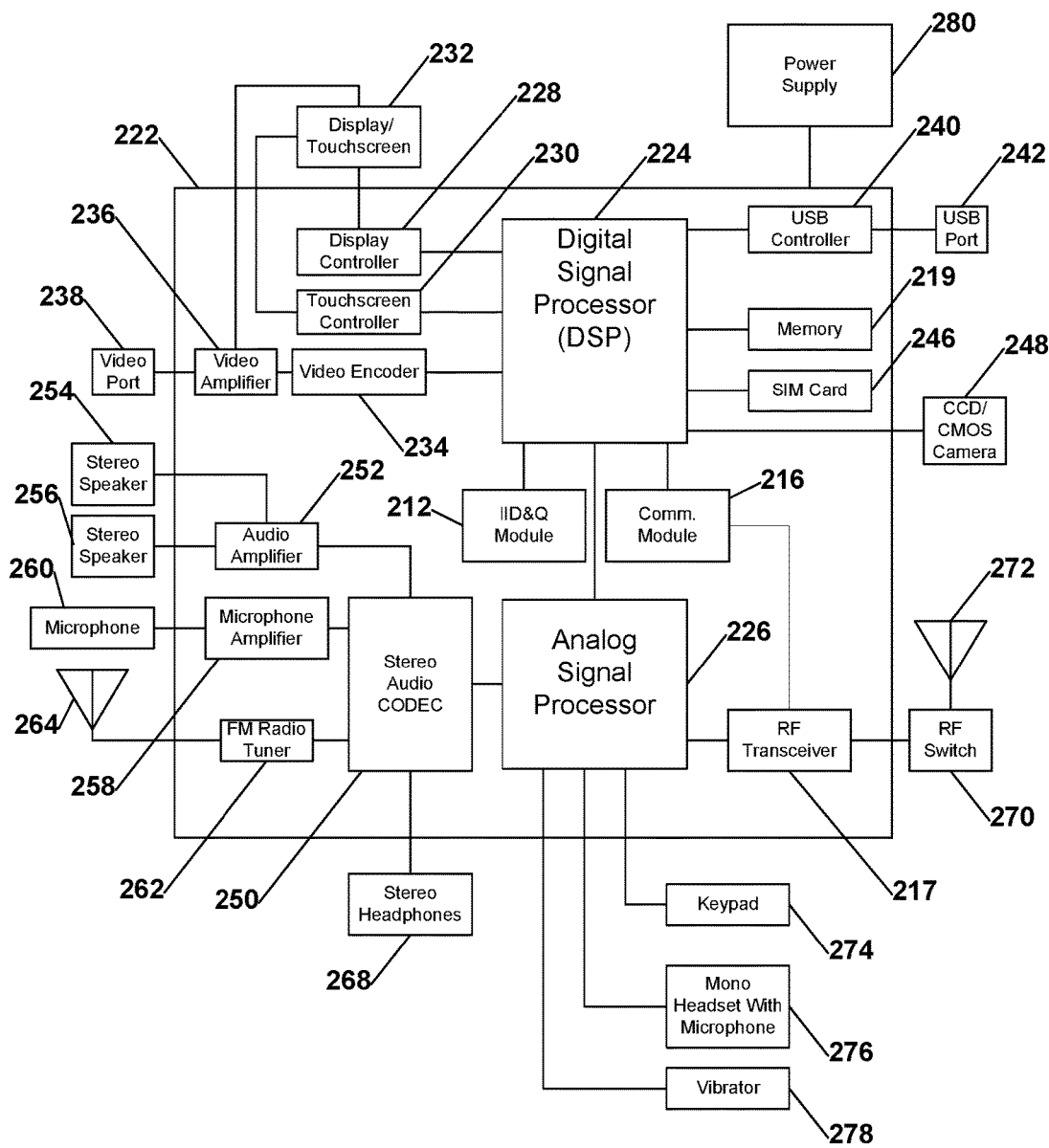
FIG. 3 is a diagram of an exemplary, non-limiting aspect of a portable computing device ("PCD") comprising a wireless tablet or telephone which corresponds with FIGS. 1-2.

FIG. 2 is a functional block diagram illustrating exemplary components of a system 100 for inventory identification and quantification ("IID&Q") according to an embodiment of the solution. The portable computing device 110 (more detail in FIG. 3 illustration and related description regarding PCD 110) may form part of an IID&Q system 100 and be equipped with, among other components and functionality, an inventory identification and quantification ("IID&Q") module 212A, a display 232A, a communications module 216A and a processor 224A. Using the IID&Q module 212A, the PCD 110A may leverage a camera subsystem to capture a video of the inventory 102 and associated symbologies 103.

Using the decoded symbology data 103, embodiments of the solution may coordinate with an inventory management and accounting (IM&A) system 106 to reconcile inventory counts with past inventory counts, sales data from a POS system 107, and inventory procurement policies. All or parts of the IID&Q algorithms may be executed by the IID&Q module 212A and/or IID&Q module 212B that may form part of the IID&Q server 105.

In application, a user of the PCD 110 may be in proximity 144 to the inventory 102. The inventory 102 may be "scanned" or videoed such that a video stream comprised of a series of frames, as would be understood by one of ordinary skill in the art, is captured and recorded. The video stream may be stored in a local storage medium 219 to the PCD 110 and/or transmitted via network 130 to IID&Q server 105 and/or IID&Q database 120, depending on embodiment.

The IID&Q module(s) 212 analyze the video on a frame by frame basis, or on an optimal frame by optimal frame basis in some embodiments, to identify inventory objects and/or their associated symbology codes captured in the video. Using methodologies more thoroughly described below, the IID&Q module(s) 212 may use feature learning techniques to identify an inventory item 102 within the video stream (or its symbology code 103), assign global coordinates to the identified inventory item in order to define the item's two-dimensional location relative to other identified items, record fingerprinting data uniquely associated with the captured image of the identified item, leverage symbology decoding logic to determine the contents of the identified item, and statistically compare the global coordinates and fingerprint data with that of previously identified inventory items in order to avoid duplicate counts of the same item.

The exemplary embodiments of a PCD 110 envision remote communication, real-time software updates, extended data storage, etc. and may be leveraged in various configurations by users of system 100. Advantageously, embodiments of PCDs 110 configured for communication via a computer system such as the exemplary system 100 depicted in the FIG. 2 illustration may leverage communications networks 130 including, but not limited to cellular networks, PSTNs, WiFi, cable networks, an intranet, and the Internet for, among other things, software upgrades, content updates, database queries, data transmission, etc. Other data that may be used in connection with a PCD 110, and accessible via the Internet or other networked system, will occur to one of ordinary skill in the art.

The illustrated computer system 100 may comprise an inventory ID&Q server 105, backend server systems (such as may comprise IM&A systems 106, 107) that may be coupled to a network 130 comprising any or all of a wide area network ("WAN"), a local area network ("LAN"), the Internet, or a combination of other types of networks.

It should be understood that the term server may refer to a single server system or multiple systems or multiple servers. One of ordinary skill in the art will appreciate that various server arrangements may be selected depending upon computer architecture design constraints and without departing from the scope of the invention. The IID&Q server 105, in particular, may be coupled to an IID&Q database 120. The database 120 may store various records related to, but not limited to, historical inventory content, purchase transaction data, item transaction data, supplier specific information, retailer specific information, real-time inventory levels, accounts receivable data, filters/rules algorithms for procurement and inventory replenishment, survey content, previously recorded feedback, etc.

When a server in system 100, such as but not limited to an IID&Q server 105, is coupled to the network 130, the server may communicate through the network 130 with various different PCDs 110 configured for recording inventory video. Each PCD 110 may run or execute web browsing software or functionality to access the server and its various applications including IID&Q module 212B. Any device that may access the network 130 either directly or via a tether to a complimentary device, may be a PCD 110 according to the computer system 100.

The PCDs 110, as well as other components within system 100 such as, but not limited to, a wireless router (not shown), may be coupled to the network 130 by various types of communication links 145. These communication links 145 may comprise wired as well as wireless links which may be either uni-directional or bi-directional communication channels, as would be understood by one of ordinary skill in the art of networking.

A PCD 110 may include a display 232, a processor 224 and a communications module 216 that may include one or more of a wired and/or wireless communication hardware and a radio transceiver 217. It is envisioned that the display 232 may comprise any type of display device such as a liquid crystal display ("LCD"), a plasma display, an organic light-emitting diode ("OLED") display, a touch activated display, a cathode ray tube ("CRT") display, a brail display, an LED bank, and a segmented display. A PCD 110 may execute, run or interface to a multimedia platform that may be part of a plug-in for an Internet web browser.

The communications module 216 may comprise wireless communication hardware such as, but not limited to, a cellular radio transceiver to transmit inventory video, or data extracted from inventory video, as well as other information to exemplary IID&Q server 105, as depicted in the system 100 embodiment. One of ordinary skill in the art will recognize that a communications module 216 may include application program interfaces to processor 224.

It is envisioned that a PCD 110 may be configured to leverage the cellular radio transceiver of the communications module 216 to transmit data, such as inventory content by way of a secure channel using a wireless link 145 to the IID&Q server 105. It is also envisioned that a PCD 110A in some exemplary embodiments of system 100 may establish a communication between the POS 125 and PCD 110A to transmit data to and from the IID&Q server 105.

Communication links 145, in general, may comprise any combination of wireless and wired links including, but not limited to, any combination of radio-frequency ("RF") links, infrared links, acoustic links, other wireless mediums, wide area networks ("WAN"), local area networks ("LAN"), the Internet, a Public Switched Telephony Network ("PSTN"), and a paging network.

An exemplary PCD 110 may also comprise a computer readable storage/memory component 219 (shown in FIG. 3) for storing, whether temporarily or permanently, various data including, but not limited to, inventory video and/or data extracted from inventory video using any combination of the methodologies described in more detail below. The memory 219 may include instructions for executing one or more of the method steps described herein. Further, the processor 224 and the memory 219 may serve as a means for executing one or more of the method steps described herein. Data added to, extracted or derived from the inventory video content may comprise fingerprint data, global coordinate data, symbology data, etc.

FIG. 3 is a diagram of an exemplary, non-limiting aspect of a portable computing device ("PCD") comprising a wireless tablet or telephone which corresponds with FIGS. 1-2. As shown, the PCD 110 includes an on-chip system 222 that includes a digital signal processor 224 and an analog signal processor 226 that are coupled together. As illustrated in FIG. 3, a display controller 228 and a touchscreen controller 230 are coupled to the digital signal processor 224. A touchscreen display 232 external to the on-chip system 222 is coupled to the display controller 228 and the touchscreen controller 230.

FIG. 3 further indicates that a video encoder 234, e.g., a phase-alternating line ("PAL") encoder, a sequential couleur avec memoire ("SECAM") encoder, a national television system(s) committee ("NTSC") encoder or any other video encoder, is coupled to the digital signal processor 224. Further, a video amplifier 236 is coupled to the video encoder 234 and the touchscreen display 232. A video port 238 is coupled to the video amplifier 236. A universal serial bus ("USB") controller 240 is coupled to the digital signal processor 224. Also, a USB port 242 is coupled to the USB controller 240. A memory 219 and a subscriber identity module ("SIM") card 246 may also be coupled to the digital signal processor 224. Further, a digital camera 248 may be coupled to the digital signal processor 224 and the IID&Q module 212. In an exemplary aspect, the digital camera 248 is a charge-coupled device ("CCD") camera or a complementary metal-oxide semiconductor ("CMOS") camera.

As further illustrated in FIG. 3, a stereo audio CODEC 250 may be coupled to the analog signal processor 226. Moreover, an audio amplifier 252 may be coupled to the stereo audio CODEC 250. In an exemplary aspect, a first stereo speaker 254 and a second stereo speaker 256 are coupled to the audio amplifier 252. FIG. 3 shows that a microphone amplifier 258 may be also coupled to the stereo audio CODEC 250. Additionally, a microphone 260 may be coupled to the microphone amplifier 258. In a particular aspect, a frequency modulation ("FM") radio tuner 262 may be coupled to the stereo audio CODEC 250. Also, an FM antenna 264 is coupled to the FM radio tuner 262. Further, stereo headphones 268 may be coupled to the stereo audio CODEC 250.

FIG. 3 further indicates that a radio frequency ("RF") transceiver 217 may be coupled to the analog signal processor 226. An RF switch 270 may be coupled to the RF transceiver 217 and an RF antenna 272. As shown in FIG. 3, a keypad 274 may be coupled to the analog signal processor 226. Also, a mono headset with a microphone 276 may be coupled to the analog signal processor 226.

Further, a vibrator device 278 may be coupled to the analog signal processor 226. Also shown is that a power supply 280 may be coupled to the on-chip system 222. In a particular aspect, the power supply 280 is a direct current ("DC") power supply that provides power to the various components of the PCD 110 that require power. Further, in a particular aspect, the power supply is a rechargeable DC battery or a DC power supply that is derived from an alternating current ("AC") to DC transformer that is connected to an AC power source.

FIG. 3 also shows that the PCD 110 may include IID&Q module 212 and a communications module 216. As described above, the RGDM module 212 may be operable work with the RF antenna 272 and transceiver 217 to establish communication with another PCD 110 or server or backend system (such as one or more of IM&A system 106, POS 107, etc.) and reconcile inventory quantifications via an IID&Q server 105.

As depicted in FIG. 3, the touchscreen display 232, the video port 238, the USB port 242, the camera 248, the first stereo speaker 254, the second stereo speaker 256, the microphone 260, the FM antenna 264, the stereo headphones 268, the RF switch 270, the RF antenna 272, the keypad 274, the mono headset 276, the vibrator 278, and the power supply 280 are external to the on-chip system 222.

In a particular aspect, one or more of the method steps described herein may be stored in the memory 219 as computer program instructions. These instructions may be executed by the digital signal processor 224, the analog signal processor 226 or another processor, to perform the methods described herein. Further, the processors, 224, 226, the memory 219, the instructions stored therein, or a combination thereof may serve as a means for performing one or more of the method steps described herein.

Figure 4:
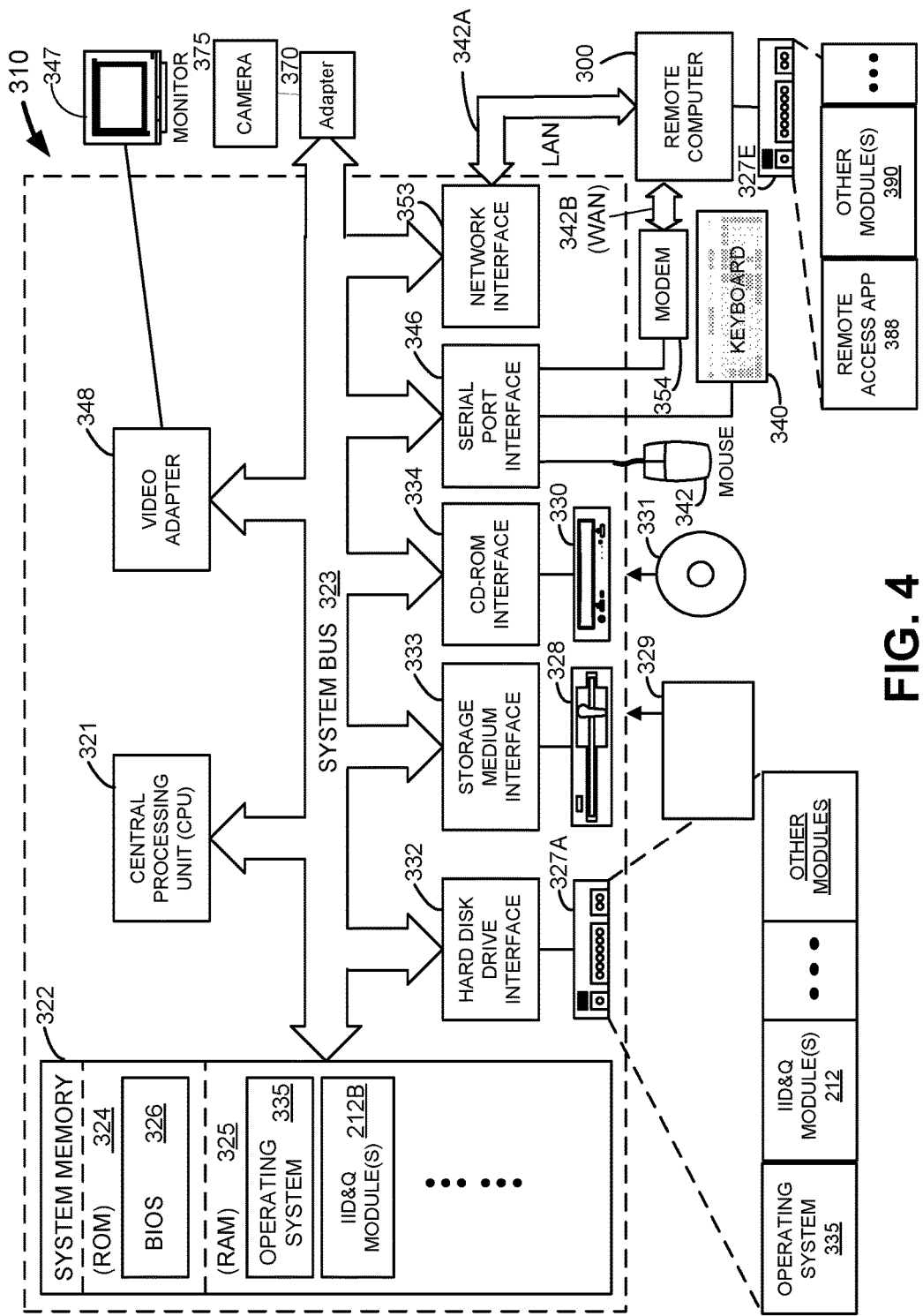
FIG. 4 is a functional block diagram of a general purpose computer that may form at least one of the inventory management and accounting system, POS system, and inventory ID&Q server illustrated in FIG. 2.

FIG. 4 is a functional block diagram of a general purpose computer that may form at least one of the inventory management and accounting system 106, POS system 107, and inventory ID&Q server 105 illustrated in FIG. 2. Generally, a computer 310 includes a central processing unit 321, a system memory 322, and a system bus 323 that couples various system components including the system memory 322 to the processing unit 321.

The system bus 323 may be any of several types of bus structures including a memory bus or memory controller, a peripheral bus, and a local bus using any of a variety of bus architectures. The system memory includes a read-only memory (ROM) 324 and a random access memory (RAM) 325. A basic input/output system (BIOS) 326, containing the basic routines that help to transfer information between elements within computer 310 such as during start-up, is stored in ROM 324.

The computer 310 may include a hard disk drive 327A for reading from and writing to a hard disk, not shown, a memory card drive 328 for reading from or writing to a removable memory card 329, and/or an optional optical disk drive 330 for reading from or writing to a removable optical disk 331 such as a CD-ROM or other optical media. Hard disk drive 327A and the memory card drive 328 are connected to system bus 323 by a hard disk drive interface 332 and a memory card drive interface 333, respectively.

Although the exemplary environment described herein employs hard disk 327A and the removable memory card 329, it should be appreciated by one of ordinary skill in the art that other types of computer readable media which may store data that is accessible by a computer, such as magnetic cassettes, flash memory cards, digital video disks, Bernoulli cartridges, RAMs, ROMs, and the like, may also be used in the exemplary operating environment without departing from the scope of the invention. Such uses of other forms of computer readable media besides the hardware illustrated may be used in internet connected devices such as in portable computing devices ("PCDs") 110 that may include personal digital assistants ("PDAs"), mobile phones, portable recording devices, tablet portable computing devices, and the like.

The drives and their associated computer readable media illustrated in FIG. 4 provide nonvolatile storage of computer-executable instructions, data structures, program modules, and other data for computer 310. A number of program modules may be stored on hard disk 327, memory card 329, optical disk 331, ROM 324, or RAM 325, including, but not limited to, an operating system 335 and IID&Q modules 212B. Consistent with that which is defined above, program modules include routines, sub-routines, programs, objects, components, data structures, etc., which perform particular tasks or implement particular abstract data types.

A user may enter commands and information into computer 310 through input devices, such as a keyboard 340 and a pointing device 342. Pointing devices 342 may include a mouse, a trackball, and an electronic pen that may be used in conjunction with a tablet portable computing device. Other input devices (not shown) may include a microphone, joystick, game pad, satellite dish, scanner, or the like. These and other input devices are often connected to processing unit 321 through a serial port interface 346 that is coupled to the system bus 323, but may be connected by other interfaces, such as a parallel port, game port, a universal serial bus (USB), or the like.

The display 347 may also be connected to system bus 323 via an interface, such as a video adapter 348. The display 347 may comprise any type of display devices such as a liquid crystal display (LCD), a plasma display, an organic light-emitting diode (OLED) display, and a cathode ray tube (CRT) display.

A camera 375 may also be connected to system bus 323 via an interface, such as an adapter 370. The camera 375 may comprise a video camera such as a webcam (see also PCD 110B from FIG. 1B). The camera 375 may be a CCD (charge-coupled device) camera or a CMOS (complementary metal-oxide-semiconductor) camera. In addition to the monitor 347 and camera 375, the computer 310 may include other peripheral output devices (not shown), such as speakers and printers.

The computer 310 may operate in a networked environment using logical connections to one or more remote computers such as the portable computing device(s) 110 illustrated in FIG. 2 and FIG. 3. The logical connections depicted in the FIG. 4 include a local area network (LAN) 342A and a wide area network (WAN) 342B, as illustrated more broadly in FIG. 2 as communications network 130. Such networking environments are commonplace in offices, enterprise-wide computer networks, intranets, and the Internet. When used in a LAN networking environment, the computer 310 is often connected to the local area network 342A through a network interface or adapter 353. The network interface adapter 353 may comprise a wireless communications and therefore, it may employ an antenna (not illustrated).

When used in a WAN networking environment, the computer 310 typically includes a modem 354 or other means for establishing communications over WAN 342B, such as the Internet. Modem 354, which may be internal or external, is connected to system bus 323 via serial port interface 346.

In a networked environment, program modules depicted relative to the remote portable computing device(s) 110, or portions thereof, may be stored in the remote memory storage device 327E (such as IID&Q module 212B). A portable computing device 110 may execute a remote access program module for accessing data and exchanging data with IID&Q modules 212B running on the computer 310.

Those skilled in the art may appreciate that the present solution for inventory identification and quantification may be implemented in other computer system configurations, including hand-held devices, multiprocessor systems, microprocessor based or programmable consumer electronics, network personal computers, minicomputers, mainframe computers, and the like. Embodiments of the solution may also be practiced in distributed computing environments, where tasks are performed by remote processing devices that are linked through a communications network, such as network 130. In a distributed computing environment, program modules may be located in both local and remote memory storage devices, as would be understood by one of ordinary skill in the art.

In one or more exemplary aspects, the functions described may be implemented in hardware, software, firmware, or any combination thereof. If implemented in software, the functions may be stored on or transmitted as one or more instructions or code on a computer-readable media. Computer-readable media include both computer storage media and communication media including any device that facilitates transfer of a computer program from one place to another.

A storage media may be any available media that may be accessed by a computer. By way of example, and not limitation, such computer-readable non-transitory media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of non-transitory computer-readable media.

Figure 5A:
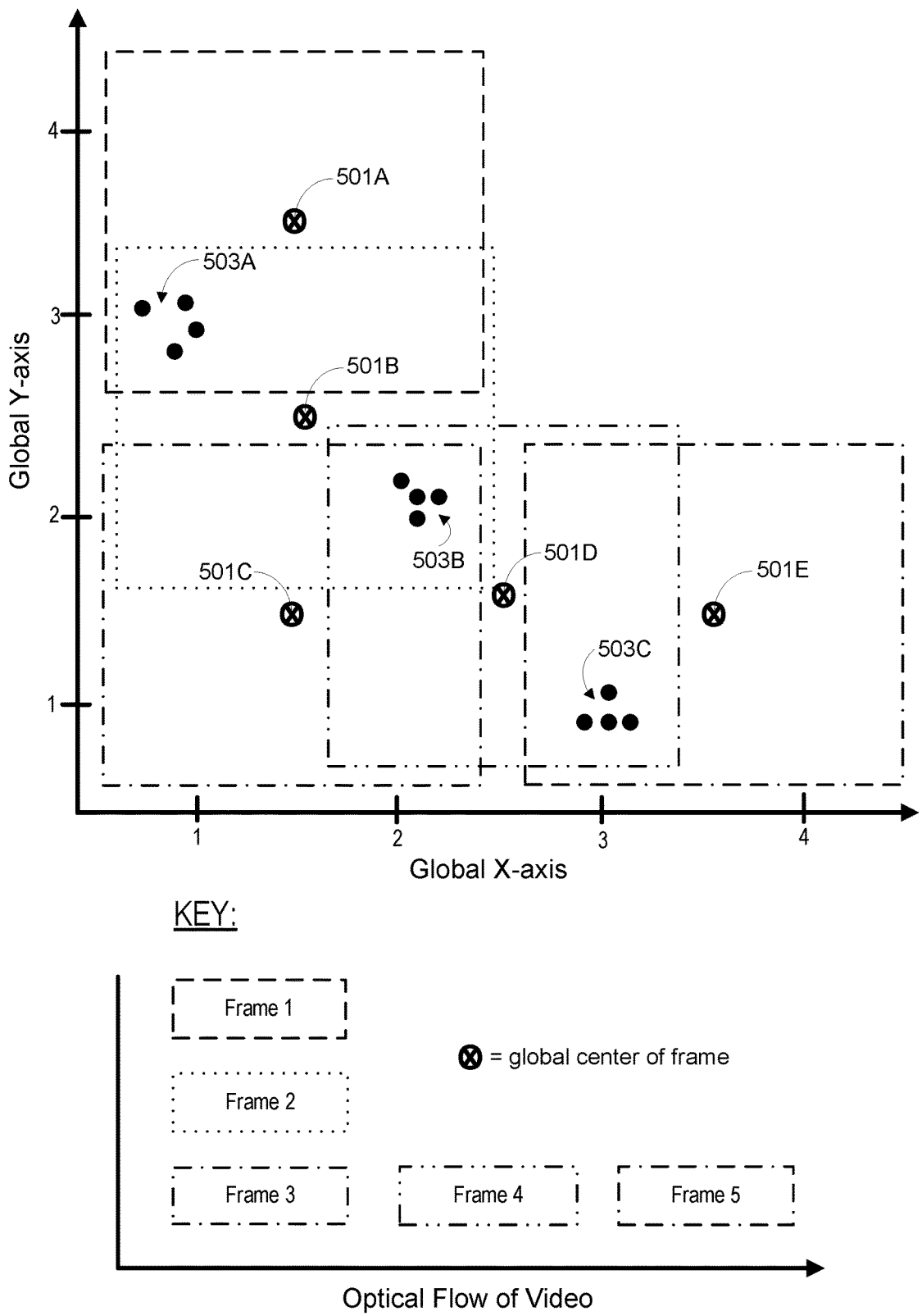
Figure 5C:
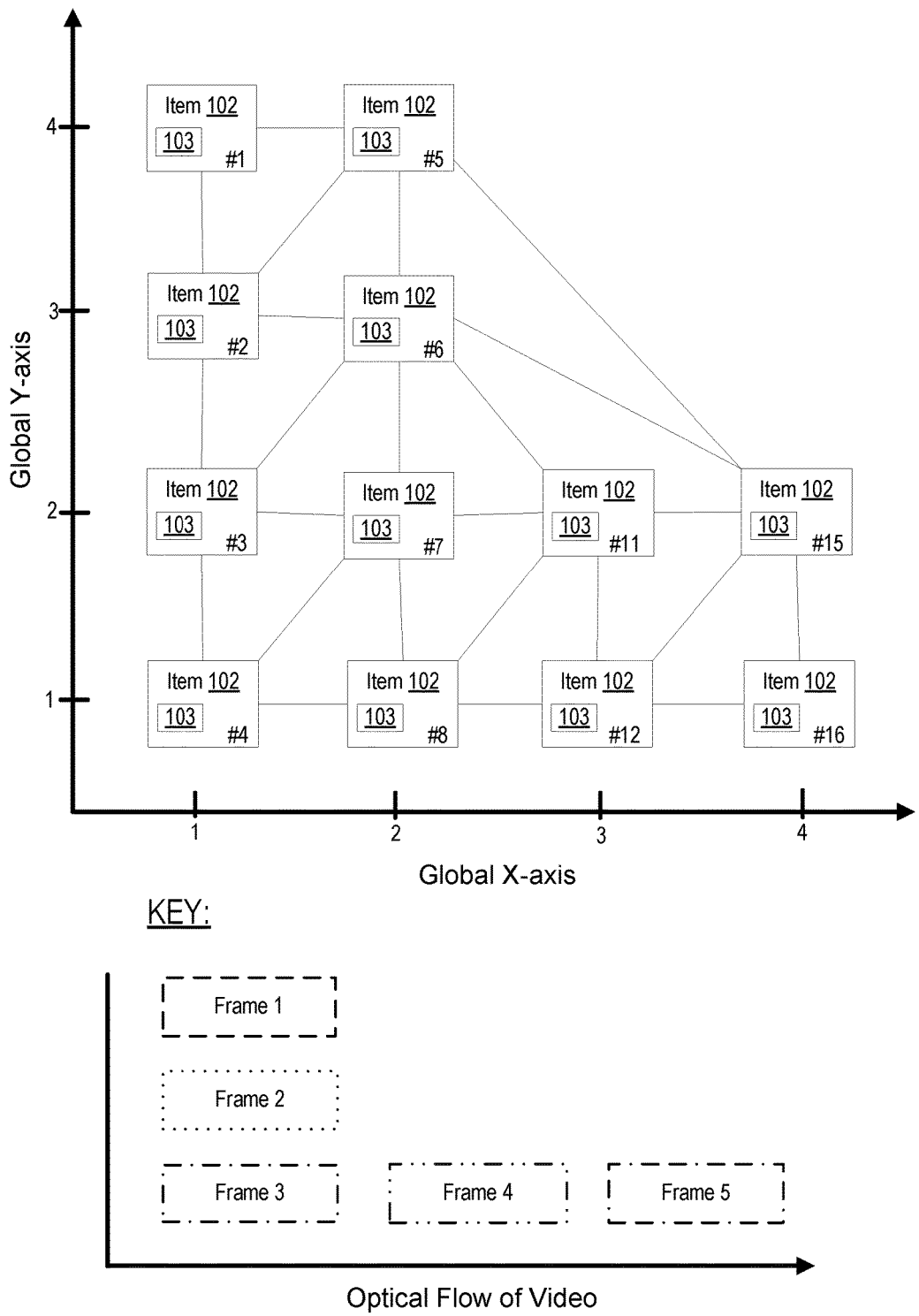

FIGS. 5A-5C collectively illustrate an exemplary embodiment of the solution as it identifies and quantifies certain inventory items captured by an exemplary video stream. To fully understand the exemplary embodiment of the solution illustrated via FIG. 5, the illustrations of FIGS. 5A-5C should be considered individually and collectively.

As will be understood from a review of the FIG. 5 illustrations, an exemplary video stream may be generated by leveraging a PCD 100 to capture either a homogenous or heterogeneous inventory (inventory depicted in FIGS. 5B and 5C). As would be understood by one of ordinary skill in the art, the video stream may be comprised of a series of still images, or frames, captured at a given frame per second ("FPS") rate. Notably, any number of frames within the stream may include captures of a given piece of inventory. Also, it should be understood that although the illustrations include a certain flow path (top to bottom, left to right, etc.) consistent with the FIG. 1 illustrations, it is envisioned that embodiments of the solution will be operable to accommodate other flow paths; indeed, it is envisioned that the ability of embodiments of the solution to accommodate different video flow paths, or even random or erratic video flow paths, is an advantageous aspect of the solution. Further, although the FIG. 5 illustrations depict a series of five temporally sequential frames from the exemplary video stream, it will be understood that embodiments of the solution are not limited to application within the context of a five frame series. Moreover, it is envisioned that embodiments of the solution may consider each and every frame within a video stream, only optimum or representative frames within a video stream, only optimum or representative series of frames within a video stream, or any combination thereof. Also, it will be understood that the demarcations used for the global x-axis and global y-axis in the FIG. 5 illustrations are for illustration only and are not meant to suggest any particular resolution required by embodiments of the solution for coordinate definition and assignment. In fact, it is envisioned that the resolution of coordinates available for assignment to objects captured in a video stream may be limited only by pixel concentration of the video stream.

Referring first to the FIG. 5A illustration, the first five exemplary frames of the exemplary video stream are depicted without a showing of the inventory items captured within the frames (inventory items depicted in FIGS. 5B and 5C). As can be understood from the FIG. 5A illustration, the exemplary embodiment first seeks to calculate and assign a set of global center coordinates 501 to each frame being considered. The Frame 1 global center coordinates 501A (1.5, 3.5) may be assigned as an initial set relative to which the global center coordinates 501B (1.6, 2.5) of Frame 2 may be determined. To do so, the method may identify relevant features 503A to track that are present in both Frame 1 and Frame 2, for example. Methodologies for identifying relevant features to track in a given series of frames may be, but are not limited to, Shi-Tomasi corner detection algorithms or Harris Corner Detection Method, as would be understood by one of ordinary skill in the art. Notably, although patterns of four "relevant features to track" are shown in the illustrations, it will be understood that in application a set of "relevant features to track" may comprise upwards of thousands of pixels.

Returning to the FIG. 5A illustration, the identified relevant features 503A may be averaged such that a virtual anchor point (0.8, 2.9) is defined. The anchor point, which represents some stationary point in the subject matter being video recorded, may be used to determine a mathematical relationship between the anchor point of the relevant features 503A and the global center 501A of Frame 1, as would be understood by one of ordinary skill in the art of Euclidean geometry, generally, and the Pythagorean theorem, specifically. Notably, because the identified relevant features 503A also appear in the image captured in Frame 2, the optical flow of the video from Frame 1 to Frame 2 may be determined using, for example, the Lucas-Kanade methodology. It is envisioned that in order to improve optical flow accuracy, certain embodiments of the solution may extend the Lucas-Kanade method by filtering points within the sets of relevant features 503 based on whether the points suggest movement against the cardinal direction of the majority of other points in the given set 503. With knowledge of the optical flow, the real distance advanced over the subject matter videoed from Frame 1 to Frame 2 may be calculated based on the average (x,y) delta between the location of the relevant features 503A to track in Frame 1 versus the same features 503A in Frame 2 (because the relevant features 503A are associated with a stationary object being videoed, the appearance that the features 503A have "moved" from one frame to the next is attributable to the magnitude and direction of the optical flow of the video). Subsequently, the global center 501B of Frame 2 may be calculated by adding the average (x,y) delta of the relevant features 503A to the global center 501A of Frame 1.

Repeating the above approach, the exemplary embodiment of the solution may determine the global center 501C of Frame 3 based on relevant feature set 503B and Frame 2 global center 501B, the global center 501D of Frame 4 based on relevant feature set 503B and Frame 3 global center 501C (or Frame 2 global center 501B), and the global center 501E of Frame 5 based on the relevant feature set 503C and Frame 4 global center 501D. In this way, using optical flow direction, common relevant feature sets in sequential frames, and previously defined global center coordinates, embodiments of the solution may systematically calculate and assign global center coordinates to frames within a video stream. Notably, the aggregate of the global center coordinates from all frames considered may be used to define a virtual plane within which the locations of individual inventory items may be defined.

Turning now to the FIG. 5B illustration, the exemplary relevant feature sets 503 shown in the FIG. 5A illustration have been removed while sixteen exemplary inventory items 102 (#1-#16), each comprising a unique symbology label 103, have been added to the illustration. Images of the inventory items 102 were captured in the video stream, as one of ordinary skill in the art would understand.

Considering Frame 1, each of inventory items 102 (#1, #2, #5, #6) was captured in the frame. By leveraging feature learning techniques, each of the inventory items 102 (#1, #2, #5, #6) may be identified in the Frame 1 along with its uniquely associated symbology 103. The unique symbology of each may be decoded according to its associated algorithm, as would be understood by one of ordinary skill in the art. Subsequently, global coordinates for each of the inventory items 102 (#1, #2, #5, #6) may be calculated based on the global center of Frame 1 (the calculation of which was described above relative to the FIG. 5A illustration). In this way, the coordinates (x,y) of the virtual location within a virtual plane may be determined for each of items 102 (#1, #2, #5, #6).

Considering Frame 2, it can be seen in the FIG. 5B illustration that inventory items 102 (#2, #3, #6, #7), along with their unique symbologies 103, were captured. Following the methodology described above, global coordinates for each of the inventory items 102 (#2, #3, #6, #7) may be calculated based on the global center of Frame 2. Notably, because the global coordinates calculated for items 102 (#2, #6) relative to global center 501B may be the same as, or their difference statistically insignificant from, the global coordinates calculated for the same items 102 (#2, #6) relative to global center 501A, the exemplary embodiment of the solution may recognize and respond to duplicate detections of those items 102 (#2, #6). Moreover, fingerprint data measured and associated with each of the items 102 (#2, #3, #6, #7) from the Frame 2 image may be compared with fingerprint data associated with items 102 (#1, #2, #5, #6) previously documented from Frame 1 analysis to improve statistical certainty that items 102 (#2, #6) were captured in both Frames 1 and 2. In this way, embodiments of the solution may avoid duplicate tallying and decoding of the symbologies 103 associated with items 102 (#2, #6).

Repeating the above approach, the exemplary embodiment of the solution may systematically identify inventory items 102 (#3, #4, #7, #8) in Frame 3, items 102 (#7, #8, #11, #12) in Frame 4, items 102 (#11, #12, #15, #16) in Frame 5, and so on. Each time an item is recognized, global coordinates determined based on the global center of the given frame in which it is recognized, along with fingerprint data associated with its recognition, may be compared with inventory items 102 identified in previous frames to ensure, within some statistical certainty, that no given item 102 is duplicated in inventory via decoding of its associated symbology 103.

Turning now to the FIG. 5C illustration, the inventory items 102 (#1-#8, #11, #12, #15, #16) identified in exemplary Frames 1-5 are depicted as vertices of induced subgraphs. By using the global coordinates assigned to each of the identified inventory items 102, an exemplary embodiment of the solution may generate neighborhoods for each inventory item 102. Considering item 102 (#6), for example, application of graph theory at the conclusion of the Frame 5 analysis may be used to define a neighborhood for item 102 (#6) comprised of items 102 (#2, #3, #5, #7, #11, #15) and any data uniquely associated with those items 102 (#2, #3, #5, #7, #11, #15). Subsequently, as the exemplary method moves forward to identify and read inventory objects (i.e., symbologies 103) captured in a next Frame 6 (not shown in the FIG. 5 illustrations), the inevitable identification of inventory items 102 (#10, #14), the relative position of which can be seen in the FIG. 5B illustration, may cause the exemplary embodiment to update the neighborhood of item 102 (#6) to remove item 102 (#15) and add item 102 (#10). Advantageously, by generating and updating neighborhoods for each of the inventory items 102 as they are identified, embodiments of the solution may leverage the neighborhood subgraph data along the way to improve statistical certainty when determining whether an identified object in a given frame is new or previously recorded. Notably, for any given inventory item 102, there will be a unique neighborhood for that item 102 relative to other items 102.

FIG. 6 is an exemplary inventory record 600 generated by the embodiment of FIG. 5 and recorded in IID&Q database 120. As can be seen in the FIG. 6 illustration, for each captured item 102 identified in a frame depicted in the FIG. 5 illustrations, global coordinates were determined relative to the global center of the given frame, fingerprint data was calculated and documented, a neighborhood was defined, and item contents derived from the scan of an associated symbology 103. Based on a statistical comparison of the various data recorded for each identified object, a captured item is determined to be either a newly identified item or a previously identified item and, in accordance, is either counted or not counted. Exemplary fingerprint data for a given identified object may include, but is not limited to including, a neighborhood set, hash value, quantity of hough lines, non-zero pixel ratio, black/white pixel ratio, white balance value, and object size.

Figure 7A:
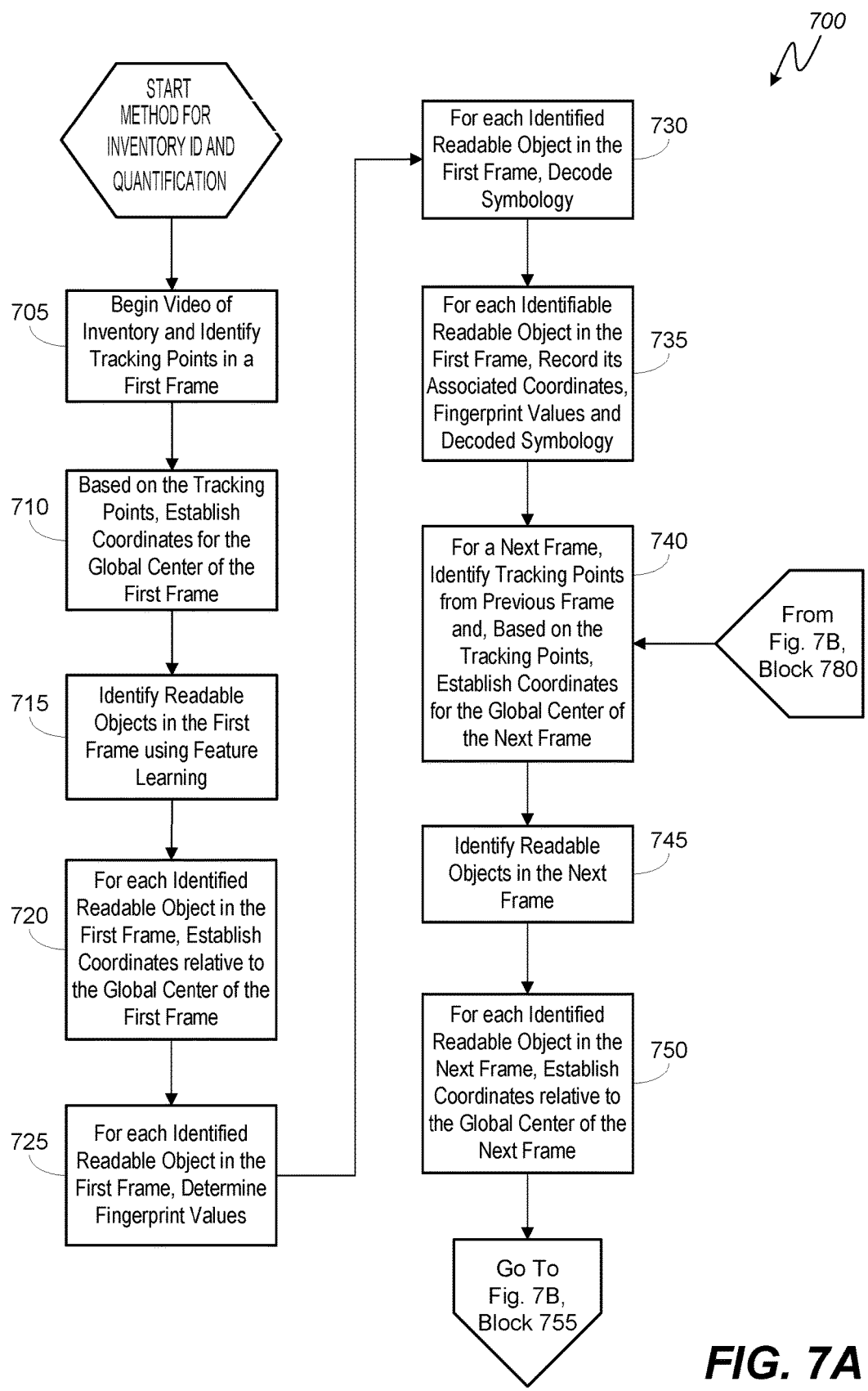
FIGS. 7A-7B illustrate a flow chart of an exemplary method for inventory identification and quantification according to an embodiment of the solution.
Figure 7B:
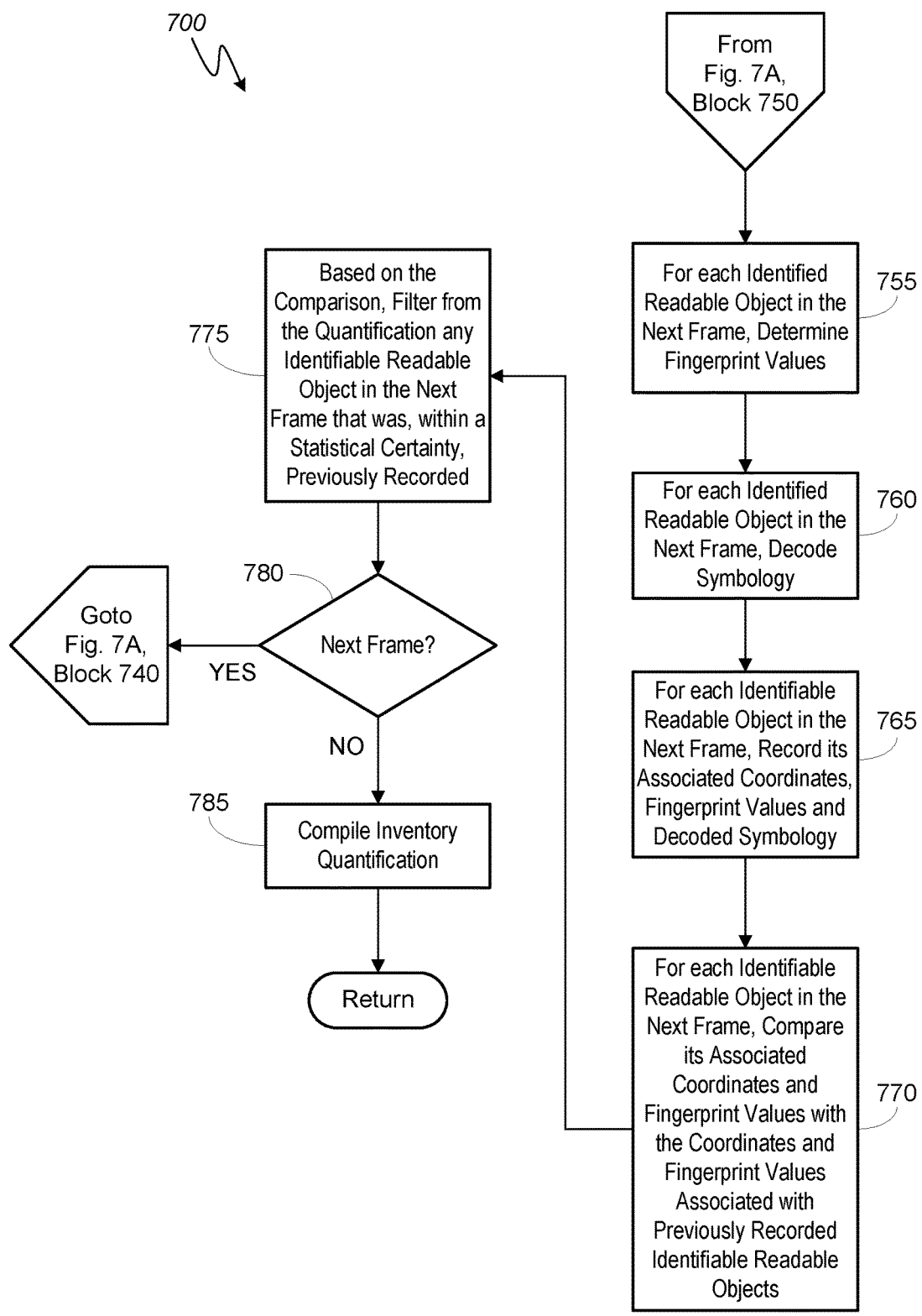

FIGS. 7A-7B illustrate a flow chart of an exemplary method 700 for inventory identification and quantification according to an embodiment of the solution. Beginning at block 705, a video stream may be generated by leveraging a camera subsystem comprised within a PCD 100 or the like.

Within the first frame, a set of tracking points 503 may be identified and, at block 710, mathematically mapped relative to a set of coordinates for a global center of the first frame. At block 715, using feature learning techniques, objects such as inventory objects and/or associated symbology identifiers 103 may be identified. Next, at block 720, for each identified and readable object in the first frame, global coordinates may be determined relative to the global center of the frame and associated with the given object. At block 725, fingerprint data associated with each identified object in the Frame 1 may be determined and, at block 730, a readable symbology recognized in association with the identified object may be decoded. Subsequently, at block 735, for each identifiable and readable object in the First frame the global coordinates, fingerprint data and decoded symbology may be recorded in association with the object.

The method 700 continues to a next frame. At block 740, tracking points from a previous frame are located in the next frame and, based on the position of the tracking points in the next frame relative to their position in the previous frame, coordinates for a global center of the next frame are established. At block 745, readable objects in the next frame are identified and, at block 750, global coordinates for the identified objects are calculated based on the global center of the next frame. At block 755, for each identified object in the next frame, fingerprint data is measured and, at block 760, symbology data associated with the identified object may be decoded. Subsequently, at block 765, for each identifiable and readable object in the next frame the global coordinates, fingerprint data and decoded symbology may be recorded in association with the object. Then, at block 770, global coordinates and fingerprint data for each object identified in the next frame may be compared to global coordinates and fingerprint data for each object identified in a previous frame (such as the First frame, for example). At block 775, based on the comparison, objects identified in the next frame that, within some statistical certainty, were previously identified in a previous frame and successfully documented are filtered, or otherwise flagged, from the inventory quantification or tally.

The method 700 continues to decision block 780. If at decision block 780 it is determined that there is an additional or next frame for analysis, then the "yes" branch is followed back to block 740. Otherwise, the "no" branch is followed to block 785 and the inventory quantification is compiled using data decoded from the symbologies associated with those identified items not filtered from the quantification. The method 700 returns.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Also, in some instances, multiple actions depicted and described as unique steps in the present disclosure may be comprised within a single step. Further, words such as "thereafter", "then", "next", "subsequently", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The functionality of the claimed computer implemented processes is explained in more detail in the above description and in conjunction with the Figures which may illustrate various process flows.

Therefore, although selected aspects have been illustrated and described in detail, it will be understood that various substitutions and alterations may be made therein without departing from the spirit and scope of the present invention, as defined by the following claims.

What is claimed is:

1. A method for inventory identification and quantification using a portable computing device ("PCD") comprising a camera subsystem, the method comprising:
    capturing a video stream of a physical inventory comprised of a plurality of individual inventory items, wherein the video stream comprises a series of frames;
    in a first frame and a second frame, identifying a set of tracking points;
    calculating a set of coordinates defining a global center of the first frame;
    based on a first location of the tracking points in the first frame and a second location of the tracking points in the second frame, determining an optical flow direction from the first frame to the second frame;
    based on the optical flow direction and a delta of the second location of the tracking points in the second frame relative to the first location of the tracking points in the first frame, calculating a set of coordinates defining a global center of the second frame;
    identifying inventory items captured in the first frame;
    for each identified inventory item captured in the first frame, calculating global coordinates relative to the global center of the first frame, decoding a symbology associated with the identified inventory item, and recording the global coordinates and decoded symbology in association with the identified inventory item;
    for each identified inventory item captured in the second frame, calculating global coordinates relative to the global center of the second frame, decoding a symbology associated with the identified inventory item, and recording the global coordinates and decoded symbology in association with the identified inventory item;
    for each identified inventory item from the second frame, comparing its global coordinates with global coordinates associated with inventory items identified from the first frame; and
    for each identified inventory item from the second frame having global coordinates that are statistically insignificantly different from global coordinates associated with an inventory item identified from the first frame, flagging such identified inventory item from the second frame as a duplicate capture and filtering its associated decoded symbology from an inventory quantification.

2. The method of claim 1, further comprising:
    for each identified inventory item captured in the first frame, calculating fingerprint data and recording the fingerprint data in association with the identified inventory item;
    for each identified inventory item captured in the second frame, calculating fingerprint data and recording the fingerprint data in association with the identified inventory item;

for each identified inventory item from the second frame, comparing its fingerprint data with fingerprint data associated with inventory items identified from the first frame; and for each identified inventory item from the second frame having global coordinates and fingerprint data that are statistically insignificantly different from global coordinates and fingerprint data associated with an inventory item identified from the first frame, flagging such identified inventory item from the second frame as a duplicate capture and filtering its associated decoded symbology from an inventory quantification.

3. The method of claim 2, wherein the fingerprint data for each identified inventory item comprises a neighborhood of inventory items.

4. The method of claim 2, wherein the fingerprint data comprises one or more of the following group: hash value, quantity of hough lines, non-zero pixel ratio, black/white pixel ratio, white balance value, and object size.

5. The method of claim 1, wherein the set of tracking points are calculated using at least one of the Shi-Tomasi method and the Harris Corner Detection method.

6. The method of claim 1, wherein the optical flow direction is determined using the Lucas-Kanade method.

7. A system for inventory identification and quantification using a portable computing device ("PCD") comprising a camera subsystem, the method comprising:

means for capturing a video stream of a physical inventory comprised of a plurality of individual inventory items, wherein the video stream comprises a series of frames;

means for, in a first frame and a second frame, identifying a set of tracking points;

means for calculating a set of coordinates defining a global center of the first frame;

means for, based on a first location of the tracking points in the first frame and a second location of the tracking points in the second frame, determining an optical flow direction from the first frame to the second frame;

means for, based on the optical flow direction and a delta of the second location of the tracking points in the second frame relative to the first location of the tracking points in the first frame, calculating a set of coordinates defining a global center of the second frame;

means for identifying inventory items captured in the first frame;

for each identified inventory item captured in the first frame, means for calculating global coordinates relative to the global center of the first frame, decoding a symbology associated with the identified inventory item, and recording the global coordinates and decoded symbology in association with the identified inventory item;

for each identified inventory item captured in the second frame, means for calculating global coordinates relative to the global center of the second frame, decoding a symbology associated with the identified inventory item, and recording the global coordinates and decoded symbology in association with the identified inventory item;

for each identified inventory item from the second frame, means for comparing its global coordinates with global coordinates associated with inventory items identified from the first frame; and for each identified inventory item from the second frame having global coordinates that are statistically insignificantly different from global coordinates associated with an inventory item identified from the first frame, means for flagging such identified inventory item from the second frame as a duplicate capture and filtering its associated decoded symbology from an inventory quantification.

8. The system of claim 7, further comprising:

for each identified inventory item captured in the first frame, means for calculating fingerprint data and recording the fingerprint data in association with the identified inventory item;

for each identified inventory item captured in the second frame, means for calculating fingerprint data and recording the fingerprint data in association with the identified inventory item;

for each identified inventory item from the second frame, means for comparing its fingerprint data with fingerprint data associated with inventory items identified from the first frame; and for each identified inventory item from the second frame having global coordinates and fingerprint data that are statistically insignificantly different from global coordinates and fingerprint data associated with an inventory item identified from the first frame, means for flagging such identified inventory item from the second frame as a duplicate capture and filtering its associated decoded symbology from an inventory quantification.

9. The system of claim 8, wherein the fingerprint data for each identified inventory item comprises a neighborhood of inventory items.

10. The system of claim 8, wherein the fingerprint data comprises one or more of the following group: hash value, quantity of hough lines, non-zero pixel ratio, black/white pixel ratio, white balance value, and object size.

11. The system of claim 7, wherein the set of tracking points are calculated using at least one of the Shi-Tomasi method and the Harris Corner Detection method.

12. The system of claim 7, wherein the optical flow direction is determined using the Lucas-Kanade method.

13. The system of claim 7, wherein the PCD is in the form of a wireless telephone.

14. A computer program product comprising a computer usable memory device having a computer readable program code embodied therein, said computer readable program code executable to implement a method for inventory identification and quantification using a portable computing device ("PCD") comprising a camera subsystem, the method comprising:

capturing a video stream of a physical inventory comprised of a plurality of individual inventory items, wherein the video stream comprises a series of frames;

in a first frame and a second frame, identifying a set of tracking points;

calculating a set of coordinates defining a global center of the first frame;

based on a first location of the tracking points in the first frame and a second location of the tracking points in the second frame, determining an optical flow direction from the first frame to the second frame;

based on the optical flow direction and a delta of the second location of the tracking points in the second frame relative to the first location of the tracking points in the first frame, calculating a set of coordinates defining a global center of the second frame;

identifying inventory items captured in the first frame;

for each identified inventory item captured in the first frame, calculating global coordinates relative to the global center of the first frame, decoding a symbology associated with the identified inventory item, and recording the global coordinates and decoded symbology in association with the identified inventory item;

for each identified inventory item captured in the second frame, calculating global coordinates relative to the global center of the second frame, decoding a symbology associated with the identified inventory item, and recording the global coordinates and decoded symbology in association with the identified inventory item;

for each identified inventory item from the second frame, comparing its global coordinates with global coordinates associated with inventory items identified from the first frame; and for each identified inventory item from the second frame having global coordinates that are statistically insignificantly different from global coordinates associated with an inventory item identified from the first frame, flagging such identified inventory item from the second frame as a duplicate capture and filtering its associated decoded symbology from an inventory quantification.

15. The computer program product of claim 14, the method further comprising:

for each identified inventory item captured in the first frame, calculating fingerprint data and recording the fingerprint data in association with the identified inventory item;

for each identified inventory item captured in the second frame, calculating fingerprint data and recording the fingerprint data in association with the identified inventory item;

for each identified inventory item from the second frame, comparing its fingerprint data with fingerprint data associated with inventory items identified from the first frame; and for each identified inventory item from the second frame having global coordinates and fingerprint data that are statistically insignificantly different from global coordinates and fingerprint data associated with an inventory item identified from the first frame, flagging such identified inventory item from the second frame as a duplicate capture and filtering its associated decoded symbology from an inventory quantification.

16. The computer program product of claim 15, wherein the fingerprint data for each identified inventory item comprises a neighborhood of inventory items.

17. The computer program product of claim 15, wherein the fingerprint data comprises one or more of the following group: hash value, quantity of hough lines, non-zero pixel ratio, black/white pixel ratio, white balance value, and object size.

18. The computer program product of claim 14, wherein the set of tracking points are calculated using at least one of the Shi-Tomasi method and the Harris Corner Detection method.

19. The computer program product of claim 14, wherein the optical flow direction is determined using the Lucas-Kanade method.

20. The computer program product of claim 14, wherein the PCD is in the form of a wireless telephone.

* * * * *